United States Patent
Friedrich et al.

(10) Patent No.: US 7,110,909 B2
(45) Date of Patent: Sep. 19, 2006

(54) SYSTEM AND METHOD FOR ESTABLISHING A DOCUMENTATION OF WORKING PROCESSES FOR DISPLAY IN AN AUGMENTED REALITY SYSTEM IN PARTICULAR IN A PRODUCTION ASSEMBLY SERVICE OR MAINTENANCE ENVIRONMENT

(75) Inventors: Wolfgang Friedrich, Bubenreuth (DE); Mehdi Hamadou, Erlangen (DE); Soeren Moritz, Wimmelbach (DE)

(73) Assignee: Siemens Aktiengesellschaft, Munich (DE)

( * ) Notice: Subject to any disclaimer, the term of this patent is extended or adjusted under 35 U.S.C. 154(b) by 146 days.

(21) Appl. No.: 10/497,275

(22) PCT Filed: Nov. 22, 2002

(86) PCT No.: PCT/DE02/04293

§ 371 (c)(1),
(2), (4) Date: May 27, 2004

(87) PCT Pub. No.: WO03/050626

PCT Pub. Date: Jun. 19, 2003

(65) Prior Publication Data

US 2005/0021281 A1   Jan. 27, 2005

(30) Foreign Application Priority Data

Dec. 5, 2001 (DE) ................. 101 59 610

(51) Int. Cl.
*G06F 15/00* (2006.01)

(52) U.S. Cl. ...................... 702/150; 725/131

(58) Field of Classification Search .......... 702/62, 702/68, 80, 94, 95, 122, 150–153, 175; 725/131, 725/135, 145, 147, 148; 345/473, 474, 689
See application file for complete search history.

(56) References Cited

U.S. PATENT DOCUMENTS

| 5,729,471 A * | 3/1998 | Jain et al. ............... 725/131 |
| 6,094,625 A | 7/2000 | Ralston |
| 6,195,104 B1 * | 2/2001 | Lyons ................. 345/473 |
| 6,400,374 B1 * | 6/2002 | Lanier ................ 345/630 |

FOREIGN PATENT DOCUMENTS

| DE | 100 06 126 A 1 | 8/2000 |
| DE | 201 09 937 U 1 | 10/2001 |
| WO | WO 00/52537 | 9/2000 |
| WO | WO 00/52538 | 9/2000 |
| WO | WO 01/24536 A3 | 4/2001 |
| WO | WO 02/067067 A2 | 8/2002 |

* cited by examiner

*Primary Examiner*—Carol S. W. Tsai
*Assistant Examiner*—Mohamed Charioui

(57) ABSTRACT

A system and method for augmnented reality documentation of a work process such as production, installation, or maintenance. A camera records images of objects in the work process. A tracking mechanism determines the position and orientation of the camera relative to points in space. A mobile computer at the workstation processes the camera images and the position and orientation of the camera, and relays this information to a remote computer system. A technical editor uses the remote computer system to supplement the image data with symbols and text assigned to points in space, producing support documentation for the work process. This information may be displayed on goggles on a service technician perforiming the work, making the support documentation appear as if displayed in space adjacent to the objects in a workflow sequence to guide the technician.

20 Claims, 1 Drawing Sheet

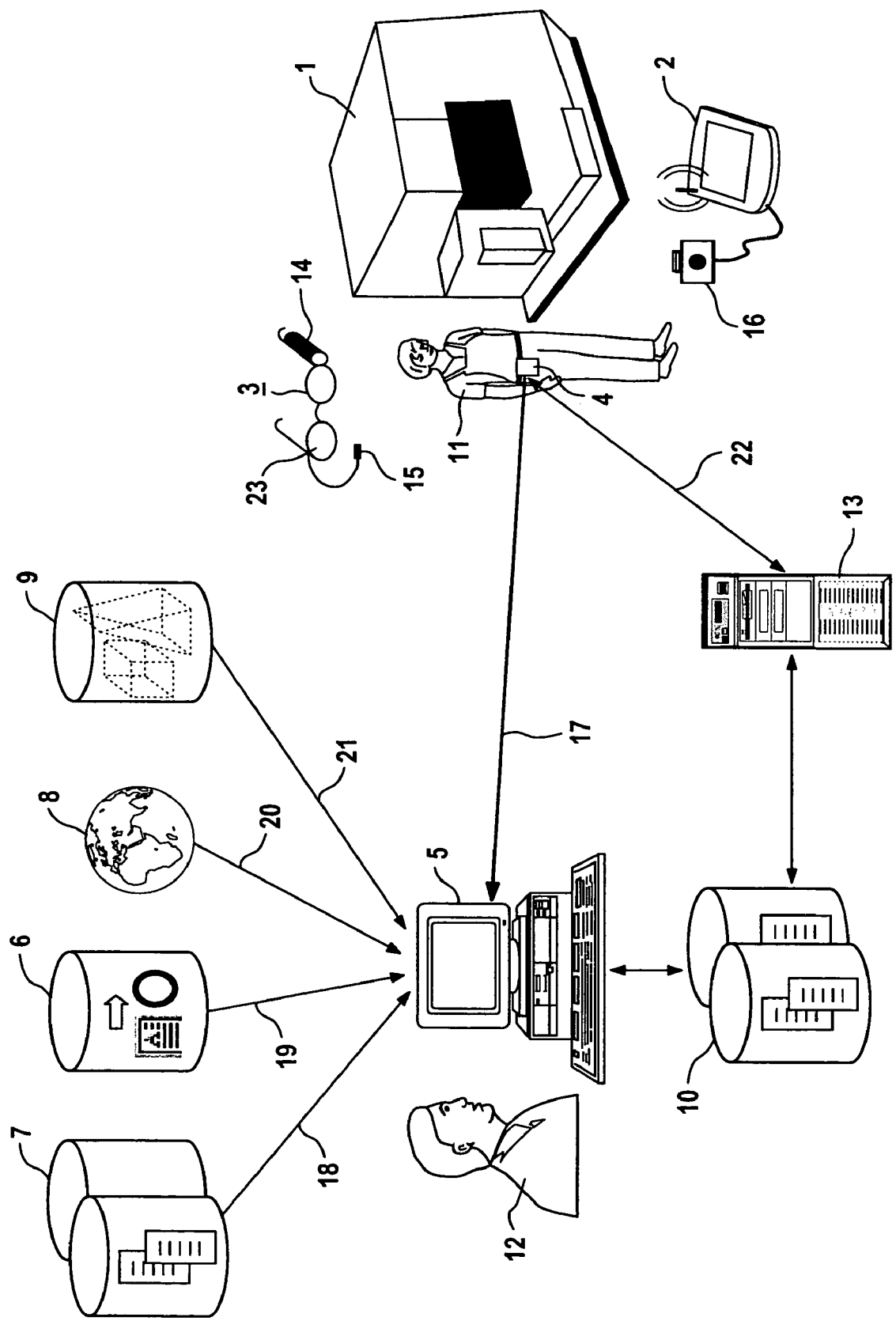

SYSTEM AND METHOD FOR ESTABLISHING A DOCUMENTATION OF WORKING PROCESSES FOR DISPLAY IN AN AUGMENTED REALITY SYSTEM IN PARTICULAR IN A PRODUCTION ASSEMBLY SERVICE OR MAINTENANCE ENVIRONMENT

CROSS REFERENCE TO RELATED APPLICATIONS

This application is the US National Stage of International Application No. PCT/DE02/04293, filed Nov. 22, 2002 and claims the benefit thereof. The International Application claims the benefits of German application No. 10159610.3 filed Dec. 5, 2001, both of the applications are incorporated by reference herein in their entirety.

FIELD OF INVENTION

The invention relates to a system and method for producing documentation for work processes, in particular in a production, assembly, service or maintenance environment.

BACKGROUND OF INVENTION

A system and method of this type is used, for example, in the field of automation technology, for production machinery and machine tools, in process automation, for diagnostic/service support systems, and for complex components, devices and systems, such as for example vehicles and industrial machines and facilities. One particularly advantageous use is in conjunction with AR ("augmented reality"), a new form of human/technology interaction in which the visual field of the user is enriched by computer-generated virtual objects—for example by means of data goggles. However, the display is composed on a context-dependent basis, i.e. adapted for and based on the object which is being looked at, e.g. a component. In this way, the real-world field of view of a fitter, for example, is enhanced by assembly notes displaying items of information which are important to the fitter. In this case, one effect of augmented reality can be to replace a conventional assembly manual.

WO 00/52537 describes a system for providing a worker with on-site support, appropriate to the situation, from a remote expert, whereby data is transmitted to the expert, for example in the form of video images, and the expert supplies the supporting information in the form of augmented reality information, which is then available locally to the worker.

WO 01/24536 describes a system for the visual display of computer graphics in combination with a pictorial representation of real objects, with which the appearance and orientation of the display for the graphics and the real object are maintained even if, for example, a camera used to record the real object changes its position so that the object is observed from a different viewing angle.

SUMMARY OF INVENTION

The object underlying the invention is to facilitate the production of work process documentation which utilizes the methods of augmented reality.

This object is achieved by the claims.

The solution approach presented here relates to the use of augmented reality in assembly, and in the service and maintenance field.

The invention is based on the recognition that the production of documentation for work processes can be significantly simplified by using the facilities of augmented reality. Until now there have been no professional systems for generating augmented reality systems. The system and method according to the invention simplify the engineering of augmented reality content for assembly and service instructions. For this purpose, the information acquired on-site about one or more work processes is processed in the mobile computer and passed on to the remote computer. The reproduction of the on-site image data and the supplementary items of information from the work processes, using the first reproduction means of the remote computer, gives technical editors authentic items of information about the work processes, even if they are not themselves present on-site. The system and method in accordance with the invention give technical editors further support in augmenting the image data which is provided to them. For this purpose, means are provided for generating items of information to supplement the image data. To permit variable and context-dependent augmentation, the processing means provide supplementary items of information in the form of graphical elements, text items, and/or references to further information, and offer in addition the capability to assign these items of supplementary information to points in space. The items of information which supplement the image data, their assignment to points in space, and the tracking data, are saved in storage means as documentation for the work processes, using the facilities of augmented reality, for later use. The image data used for producing the documentation is no longer required after the production of the documentation has been completed, and hence will not be saved. This means that compared to previous documentation systems there is a clear reduction in the storage space required for storing the documentation. The invention avoids the hitherto rather long-winded production of augmented reality scenes, for example in the case of laboratory systems, which has only been possible by manual processing of auxiliary files. By contrast with that, the invention offers a self-contained system and method, from the recording of the image information through its subsequent processing and passing on to a remote computer system down to the processing and production of augmented reality documentation.

In an advantageous embodiment of the invention, the supplementary items of information stored in the storage means are displayed in a user's visual field by means of a second reproduction means. The user is given context-dependent information which has, for example, been assigned to a particular component, in that these supplementary items of information are arranged in the user's visual field according to their assignments to points in space. This makes it possible, for example, to reproduce mixed virtual assembly situations directly in the user's visual field thereby, for example, making the installation of machines significantly simpler for technicians in a flexible production situation. Production planning and control in the workshop, in a way appropriate for the technicians, is simplified if details of the status of the order concerned are reproduced or can be seen, as appropriate, locally and directly in conjunction with the associated products. The same applies also to assembly, for which individual work steps can be presented in mixed virtual form to the user, for example a fitter, even during the training phase. In this connection it is possible—for example by the comparison of real assembly operation sequences with simulation results—to achieve comprehensive optimization, which not only improves the quality of work planning but also simplifies and speeds up the assembly process in the critical run-up phase.

In a further advantageous embodiment of the invention, the remote computer system has a symbol library to provide the graphical elements and a document library to provide the text items. This supports the simple, rapid and standardized production of documentation for the work processes. The symbol library would contain, for example, such graphical elements as arrows, circles etc., which can be used to mark screws, holders or the required handgrips. The document library would comprise, for example, simple basic elements incorporating text elements which describe assembly/disassembly steps.

A technical editor who uses the processing means of the remote computer system can obtain further items of information about the work processes on-site if, in accordance with a further embodiment of the invention, recording means are provided for recording auditory information about the work processes. In doing this, the mobile computer will be used to process the auditory information which is recorded, and to pass on the auditory information to the remote computer system as audio data, and the first reproduction means of the remote computer system will be used for reproducing the audio data. Thus a work process can be described, for example, by spoken information from the fitter, this being made available to the technical editor on the remote computer system.

In a further advantageous embodiment of the invention, the processing means are used for assigning the items of supplementary information to work steps within a workflow, and control means are provided for the user to control the second reproduction means. By this embedding of the augmented and documented work processes in a work flow, it becomes possible to call them up for use in service situations. The technical editor generates the workflow with the help of the processing means. Special verbal comments by the on-site fitter can be embedded in this workflow as annotations from experience. A fitter can make use of documentation for a work process produced in such a way by calling up those parts of the augmented reality documentation which describe the particular work steps of interest to him/her. In addition, by the assignment of the items of supplementary information to work steps within a workflow, the size of the documentation to be stored can be critically reduced. Only the really important work steps for a work process are documented and stored in a structured manner within the workflow.

BRIEF DESCRIPTION OF THE DRAWING

The invention is described and explained in more detail below by reference to the exemplary embodiment shown in the FIGURE.

The FIGURE shows an exemplary embodiment of a system for producing documentation for work processes.

DETAILED DESCRIPTION OF INVENTION

The FIGURE shows an exemplary embodiment of a system for producing documentation for work processes. The FIGURE shows a plant or machine 1 at which the user, in the exemplary embodiment a fitter 11, performs one or more work processes. The fitter 11 wears a headset 3, which is shown as a separate enlargement in the FIGURE. The headset 3 of the fitter 11 has data goggles 23, a microphone 15 and a first camera 14. The components 14, 15, 23 of the headset 3 have a wireless or wired link to a mobile computer 4, which the fitter 11 carries with him/her. The mobile computer 4 has a link 17 to a remote computer system 5. This computer system 5 is linked via further links 18, 19, 20 and 21 to a document library 7, a symbol library 6, the World Wide Web 8 and/or a CAD product model 9. The computer system 5 is operated by a technical editor, and has access to documentation 10 which is stored on a server 13. This server 13 has a further connection 22 to the mobile computer 4 of the fitter 11. The FIGURE also shows a web pad 2, which is connected to a second camera 16.

In the exemplary embodiment shown in the FIGURE, a user—in this case a fitter 11—is disassembling a component of the machine 1 for which a malfunction is indicated. The work process carried out by the fitter 11, that is to say in this case a disassembly process, is recorded by a first camera 14 on a headset 3 of the fitter 11. In the region of the goggle lenses, the headset 3 has a display device attached on the data goggles, the camera 14 attached on the data goggles, and a microphone 15 attached on the data goggles for recording voice commands. The items of image information recorded by the first camera 14 are processed in the mobile computer 4 of the fitter 11, and are passed on via the link 17 as image data to the remote computer system 5 of a technical editor 12. Using tracking means, the position and orientation of the camera 14 are determined relative to points in space, e.g. relative to a particular component of machine 1 or to markers attached to machine 1. The position and orientation of the camera thus determined are also processed by the mobile computer 4, and are passed on as tracking data to the computer system 5 via the communication link 17.

In the example, the image data is transmitted via the communication link 17 as a video stream, for example using the MPEG4 format or technology, as applicable, synchronously with the tracking data. Optionally, it is also possible to transmit via the communication link 17 spoken comments which have been recorded by recording means, e.g. the microphone 15 on the headset 3 of the fitter 11, together with the video stream. The spoken comments enable the technical editor 12 to gain a better understanding of complex actions within the work process. The computer system 5 contains the first reproduction means for reproducing the image data. In the exemplary embodiment, these first reproduction means take the form of a monitor, on which the items of image information for machine 1 recorded using the first camera 14 are displayed to the technical editor 12. The computer system 5 makes available to the technical editor 12 processing means, for producing items of information to supplement the image data. Using these processing means, the technical editor supplements the image data with graphical elements, items of text and/or references to other information. Using the processing means, it is possible at the same time to assign these items of supplementary information to points in space. In the example, the technical editor 12 takes from a symbol library 6 graphical elements such as arrows, circles etc., with which to mark screws, holders etc. on machine 1. From a document library 7 comprising simple basic elements the editor takes text elements which describe the assembly/disassembly steps, and attaches these to markers which have already been applied. Via the World Wide Web 8 the technical editor 12 calls up information, for example from a component supplier's product portal, not contained in the machine documentation, about other components, and in a similar way augments the assembly/disassembly process for the fitter 11 with these items of information. If he/she so wishes, the fitter 11 can have the items of supplementary information displayed immediately, synchronously with its production by the technical editor 12, using a second reproduction means, e.g. the data goggles 23 of the headset 3. He/she can thus provide the technical editor 12 with timely feedback for the purpose of quality assurance.

The items of supplementary information produced by the technical editor 12 using the processing means are stored away on storage means as documentation 10 for the work processes of the fitter 11, in the exemplary embodiment the storage being on a server 13, from which they can be called up as support material for later similar activities. Other service technicians or fitters can thus benefit from the experience and know-how of the first fitter 11 and the technical editor 12, because the instruction steps and the appropriate documentation are continuously displayed in their field of vision, as appropriate for the real world. Here, the items of supplementary information stored on the server 13 are assigned to the real objects comprising machine 1. They are correctly displayed within the visual field of the fitter 11, corresponding to their assignment. With the augmentation are saved the positions of the items of supplementary information, relative either to markers—in the case of marker-based tracking—or to such features as edges, circles, segments, lettering, etc.—in the case of markerless tracking.

In the exemplary embodiment, the augmented scene, i.e. the work process with the items of supplementary information, is embedded in a workflow, so that it can be called up for other service situations. The technical editor 12 produces the workflow, and the technical editor 12 can embed special verbal comments from the fitter 11 into the workflow as annotations from experience. The communication link 17 between the mobile computer 4 of the fitter 11 and the computer system 5 of the technical editor 12, e.g. a PC (Personal Computer), is used for transmitting the image data and the position data for the camera in the case of non-video-based tracking methods. The communication link 17 can, for example, take the form of a radio link, or even a mixture of a radio link and a gateway. Here, any required information technology transmission mechanisms can be used. However, the nature of the application is such as to suggest a wireless connection to the computer system 5 of the technical editor 12, with or without a gateway. The data which is to be exchanged can also initially be stored locally, on the mobile computer 4 of the fitter 11 or on any gateway which is present, as appropriate, and only at a later point in time fed into the editing system, i.e. the computer system 5 of the technical editor 12.

If use is made of a non-video-based tracking system then, apart from the image data in the form of a video stream, current data from the tracking system (position, orientation and the visual field of the user or camera, as applicable) must also be transmitted synchronously. This data is required in order to determine either the relative coordinates, relative to the currently recognized marker/object, or the corresponding world coordinates. Here, the term world coordinates means the coordinates in space relative to a previously specified point in space. For the technical editor 12, the system equipment includes a recording/replay unit (video recorder functionality) as the first reproduction facility for the video steam and for any synchronized tracking data which is recorded. The recording/replay unit must be provided because in most cases the technical editor 12 cannot append the annotation in real time. In a similar way, the assembly or disassembly process can also be recorded via a web pad 2 with either a built-in or a separate camera 16, and can be augmented either at the web pad 2 or via the computer system 5 of the technical editor 12.

In a further exemplary embodiment, which is also indicated in the FIGURE, documentation for work processes can also be produced by the technical editor 12 by reference to a visualized activity sequence from a 3D design drawing of a CAD product model. Here, the technical editor 12 carries out the work process, i.e. the assembly or disassembly as applicable, with the help of the 3D elements from the 3D design drawing, and augments these 3D elements with the necessary information such as arrows, circles, text, detailed exploded drawings, the required tools, measures to secure items, etc. Here, the relative positions of the augmenting information is taken from the dimensioned 3D model, is saved with the augmented information and is called up for augmentation purposes in the service/maintenance situation. It is necessary to know, even at the point in time when this work process documentation is being produced, whether the position details must be specified relative to a marker position.

An alternative, which is better, is a marker-neutral specification, that is the use of world coordinates and the initialization of the tracking system and the markers to correspond with this world coordinate system. To provide further support in the production of documentation for work processes, further items of information can be passed from the fitter 11 to the technical editor 12 via the communication link 17. Such items of further information could be, in particular, context-related voice information from the fitter 11. Here, the context relationship is given by the linkage with items of location, component or workflow information or any marker information. The context relationship is included with the data transmitted and is saved for later context-related identification.

The relationship of the invention to the technological environment is shown below. In service situations, conventional technologies are becoming barely adequate to support and document complex diagnostic and remedial procedures. However, as these processes are anyway in many fields planned on the basis of digital data, augmented reality technologies offer the possibility of adopting the information sources for maintenance purposes and, by overlaying them with real objects, for example by means of data goggles 23, to clarify an assembly process to a fitter 11. In relation to cooperative work, the recording of image data for a work process permits a distributed problem solution, by which a remote expert communicates over global distances with the on-site fitter 11. This case is particularly relevant for the predominantly medium-sized machine tool manufacturers. Globalization is forcing these to establish production sites for their customers around the world. However, for economic reasons it is impossible to realize a presence with local offices in all the important markets, and nor is it possible to forgo the profound-knowledge of experienced service staff of the parent company in relation to systems which are becoming increasingly complex. The special aspect of the human/technology interaction with augmented reality lies in the very simple and intuitive communication with the computer, supplemented for example by multi-modal interaction technologies such as speech processing or the recognition of gestures.

In addition, the use of portable computer units makes possible completely new scenarios for mobile usage, under which the specific data can be requested at any time via a wireless network. New visualization technologies permit direct annotation with, for example, process, measurement or simulation data, on the real object or in the real environment.

In the context of distributed applications, several users can be put in a position to work in one real environment using a shared database (shared augmented environments) or to cooperate in different environments with augmented reality support.

In summary, the invention thus concerns a system and a method which simplifies the production of work process documentation which uses the methods of augmented reality, in particular in a production, assembly, service or maintenance environment. The system contains at least one camera 14, 16 for recording image information about one or more work processes, tracking means for determining the position and orientation of the camera 14, 16 relative to points in space, and a mobile computer 4 for processing the image information recorded by the camera 14, 16 and the position and orientation of the camera 14, 16, and for passing on the processed image information as image data and the position and orientation of the camera 14, 16 as tracking data to a remote computer system 5, where the remote computer system 5 has: processing means for producing items of information to supplement the image data, in the form of graphical elements, text items and/or references to further information, and for assigning the items of supplementary information to points in space, first reproduction means for reproducing the image data and the items of supplementary information, and storage means for storing the items of information which supplement the image data, their assignment to points in space and the tracking data, as documentation 10 for the work processes.

The invention claimed is:

1. A system for the production of documentation for work processes in the form of work steps for a service technician or fitter, comprising:
   at least one camera for recording images of real objects in one or more work processes;
   a tracking mechanism for determining the position and orientation of the camera relative to the real objects; and
   a mobile computer for processing the images recorded by the camera and the position and orientation of the camera, and for relaying the processed images as image data, together with the position and orientation of the camera as tracking data, to a remote computer system, wherein the remote computer system comprises:
   a first reproduction mechanism for reproducing the images from the image data;
   a processing mechanism for producing items of supplementary information that document the one or more work processes in the form of graphical elements, items of text and/or references to other items of information, and for assigning the items of supplementary information to points in space relative to respective real objects in the one or more work processes;
   a storage mechanism for storing the items of supplementary information, their assignment to points in space, and the tracking data, as documentation for the work processes; and
   a second reproduction mechanism for displaying the items of supplementary information to the service technician or fitter to guide the service technician or fitter in performing the work processes on the real objects.

2. A system in accordance with claim 1, wherein the second reproduction mechanism is used for reproducing the items of supplementary information within the visual field of a user, whereby these items of supplementary information are arranged in the user's visual field according to their assignments to points in space.

3. A system in accordance with claim 2, wherein the remote computer system has a symbol library for providing the graphical elements and a document library for providing the text items.

4. A system in accordance with claim 2, wherein
   a recording mechanism is used for recording auditory information about the work processes, wherein
   the mobile computer is used for processing the auditory information which is recorded and for relaying the auditory information to the remote computer system as audio data, and wherein
   the first reproduction mechanism of the remote computer system is used for reproducing the audio data.

5. A system in accordance with claim 2, wherein the processing mechanism is used for assigning the items of supplementary information to work steps within a workflow and a control mechanism is used for controlling the second reproduction mechanism by the user.

6. A system in accordance with claim 1, wherein the remote computer system has a symbol library for providing the graphical elements and a document library for providing the text items.

7. A system in accordance with claim 6, wherein
   a recording mechanism is used for recording auditory information about the work processes, wherein
   the mobile computer is used for processing the auditory information which is recorded and for relaying the auditory information to the remote computer system as audio data, and wherein
   the first reproduction mechanism of the remote computer system is used for reproducing the audio data.

8. A system in accordance with claim 1, wherein
   a recording mechanism is used for recording auditory information about the work processes, wherein
   the mobile computer is used for processing the auditory information which is recorded and for relaying the auditory information to the remote computer system as audio data, and wherein
   the first reproduction mechanism of the remote computer system is used for reproducing the audio data.

9. A system in accordance with claim 8, wherein the processing mechanism is used for assigning the items of supplementary information to work steps within a workflow and a control mechanism is used for controlling the second reproduction mechanism by the user.

10. A system in accordance with claim 1 wherein the mobile computer is carried by the service technician or fitter, and the items of supplementary information are displayed on goggles on the service technician or fitter, making the items of supplementary information appear to the service technician or fitter as if displayed in space adjacent to the real objects to guide the service technician or fitter in performing the work steps.

11. A method for producing documentation for work processes in the form of work steps for a service technician and/or fitter, comprising:
   recording items of image information about real objects in one or more work processes using least one camera;
   determining the position and orientation of the camera relative to points in space using a tracking mechanism;
   processing the items of image information recorded by the camera and the position and orientation of the camera by a mobile computer;

passing on the processed items of image information as image data, together with the position and orientation of the camera as tracking data, to a remote computer system;

reproducing the image data on the remote computer system using a first reproduction mechanism;

manually producing items of supplementary information that document the work processes in addition to the image data, wherein the supplementary information comprises graphical symbols, items of text and/or references to other items of information;

assigning the items of supplementary information to points in space and to the real objects;

storing the items of supplementary information, their assignment to points in space, and the tracking data, as documentation for the work processes, to produce the documentation; and displaying the items of supplementary information to the service technician or fitter on a second reproduction mechanism to guide the service technician or fitter in performing the work processes on the real objects.

12. A method in accordance with claim 11, further comprising:

reproducing the items of supplementary information within the visual field of a user, by the second reproduction mechanism; and arranging the items of supplementary information in the user's visual field according to their assignments to points in space.

13. A method in accordance with claim 12, wherein in the remote computer system, the graphical symbols are provided in a symbol library and the text items are provided in a document library.

14. A method in accordance with claim 12, further comprising:

recording auditory information about the work processes is by a recording mechanism;

processing the recorded auditory information by the mobile computer; and passing on the processed auditory information to the remote computer system as audio data; and reproducing the audio data by the first reproduction mechanism of the remote computer system.

15. A method in accordance with claim 12, wherein the items of supplementary information are assigned to work steps within a workflow by the processing mechanism and the second reproduction mechanism can be controlled by the user by a control mechanism.

16. A method in accordance with claim 11, wherein in the remote computer system, the graphical symbols are provided in a symbol library and the text items are provided in a document library.

17. A method in accordance with claim 16, further comprising:

recording auditory information about the work processes is by a recording mechanism;

processing the recorded auditory information by the mobile computer; and passing on the processed auditory information to the remote computer system as audio data; and reproducing the audio data by the first reproduction mechanism of the remote computer system.

18. A method in accordance with claim 11, further comprising:

recording auditory information about the work processes is by a recording mechanism;

processing the recorded auditory information by the mobile computer; and passing on the processed auditory information to the remote computer system as audio data; and reproducing the audio data by the first reproduction mechanism of the remote computer system.

19. A method in accordance with claim 18, wherein the items of supplementary information are assigned to work steps within a workflow by the processing mechanism and the second reproduction mechanism can be controlled by the user by a control mechanism.

20. A method in accordance with claim 11 wherein the mobile computer is carried by the service technician or fitter, and the items of supplementary information are displayed on goggles on the service technician or fitter, making the items of supplementary information appear to the service technician or fitter as if displayed in space adjacent to the real objects to guide the service technician or fitter in performing the work steps.

* * * * *